United States Patent
Ullrich et al.

(10) Patent No.: US 10,194,643 B2
(45) Date of Patent: Feb. 5, 2019

(54) EDGE FINISHING FOR A MESH

(71) Applicant: Ullrich Machinery Company Limited, Christchurch (NZ)

(72) Inventors: Mark William Ullrich, Christchurch (NZ); Nelson Hartley Thelning, Christchurch (NZ); Kevin McBride Anderson, Christchurch (NZ)

(73) Assignee: Ullrich Machinery Company Limited, Christchurch (NZ)

( * ) Notice: Subject to any disclaimer, the term of this patent is extended or adjusted under 35 U.S.C. 154(b) by 0 days.

(21) Appl. No.: 15/534,866

(22) PCT Filed: May 20, 2016

(86) PCT No.: PCT/NZ2016/050083
§ 371 (c)(1),
(2) Date: Jun. 9, 2017

(87) PCT Pub. No.: WO2016/190751
PCT Pub. Date: Dec. 1, 2016

(65) Prior Publication Data
US 2017/0367307 A1    Dec. 28, 2017

(30) Foreign Application Priority Data

May 22, 2015    (NZ) ........................................ 708418
May 20, 2016    (NZ) ........................................ 720396

(51) Int. Cl.
*B21F 27/02*    (2006.01)
*B21F 27/00*    (2006.01)
(Continued)

(52) U.S. Cl.
CPC ................ *A01K 61/60* (2017.01); *A01K 3/00* (2013.01); *A01K 75/00* (2013.01); *B21F 27/005* (2013.01); *B21F 27/14* (2013.01); *Y02A 40/826* (2018.01)

(58) Field of Classification Search
CPC .......... B21F 27/005; B21F 27/14; E02D 5/08; E02D 5/14; A01K 3/00; A01K 75/00; B07B 1/4672
See application file for complete search history.

(56) References Cited

U.S. PATENT DOCUMENTS

| 1,885,362 A | * | 11/1932 | Land ..................... B21F 27/005 |
| | | | 245/5 |
| 1,943,445 A | * | 1/1934 | Land ..................... B21F 27/005 |
| | | | 245/6 |

(Continued)

FOREIGN PATENT DOCUMENTS

| CA | 2669265 A1 | 6/2008 |
| DE | 546927 C | 3/1932 |

(Continued)

OTHER PUBLICATIONS

Extended European Search Report issued in realed PCT application dated May 17, 2018.

(Continued)

*Primary Examiner* — Bobby Muromoto, Jr.
(74) *Attorney, Agent, or Firm* — Mark H. Whittenberger; Holland & Knight LLP

(57) ABSTRACT

An edge finishing for a mesh formed by interlacing adjacent wire pickets, each picket formed in a zig-zag manner, the edge finishing comprising two interlinked loops where a first loop is formed from a first picket of the adjacent pickets and a second loop is formed from a second picket of the adjacent pickets, wherein the first loop and the second loop are (Continued)

interlocked together, via first and second loop-ends, at an intersection of the first picket and the second picket.

37 Claims, 5 Drawing Sheets

(51) Int. Cl.
*A01K 61/60* (2017.01)
*A01K 3/00* (2006.01)
*A01K 75/00* (2006.01)
*B21F 27/14* (2006.01)

(56) References Cited

U.S. PATENT DOCUMENTS

| | | | | |
|---|---|---|---|---|
| 1,943,447 | A * | 1/1934 | Land | B21F 27/005 245/6 |
| 2,005,760 | A * | 6/1935 | Southwell | B21F 27/005 245/8 |
| 2,390,200 | A * | 12/1945 | York | B21F 27/14 245/5 |
| 3,094,302 | A * | 6/1963 | Stauffer | B07B 1/4672 139/425 R |
| 3,195,160 | A * | 7/1965 | Amsen | B44D 3/162 144/115 |
| 4,154,429 | A * | 5/1979 | Brannan | H05F 3/02 109/35 |
| 4,261,068 | A * | 4/1981 | Cho | A01K 47/04 449/45 |
| 4,490,925 | A * | 1/1985 | Smith | D21F 1/0072 34/116 |
| 5,529,289 | A * | 6/1996 | Lancer, Sr. | E04H 17/1417 256/19 |
| 5,782,583 | A * | 7/1998 | Vales | E02D 5/04 405/281 |
| 2005/0127534 | A1 * | 6/2005 | Stecher | H01L 23/3142 257/787 |
| 2005/0166513 | A1 * | 8/2005 | Vanderhoef | E04F 15/02194 52/578 |
| 2017/0367307 | A1 * | 12/2017 | Ullrich | A01K 61/60 |

FOREIGN PATENT DOCUMENTS

| | | |
|---|---|---|
| JP | S5212386 A | 1/1977 |
| JP | S54174641 U | 12/1979 |
| JP | S57181447 U | 11/1982 |
| WO | 2013053603 A1 | 4/2013 |

OTHER PUBLICATIONS

International Search Report issued in International App. No. PCT/NZ2016/050083 dated Jul. 4, 2016.

\* cited by examiner

EDGE FINISHING FOR A MESH

CROSS-REFERENCE TO RELATED APPLICATIONS

This application is a U.S. National Stage of International Patent Application No. PCT/NZ2016/050083, filed 20 May 2016, which claims priority to New Zealand Patent Application No. 708418, filed on May 22, 2015 and New Zealand Patent Application No. 720396, filed on May 20, 2016. The disclosure of each application which is incorporated herein by reference in their entirety.

STATEMENT OF CORRESPONDING APPLICATIONS

This application is based on the Provisional specification filed in relation to New Zealand Patent Application Number 708418, the entire contents of which are incorporated herein by reference.

TECHNICAL FIELD

The invention relates to an edge finishing for a mesh and a method of forming the edge finishing. In particular the edge finishing relates to a wire mesh and a method of forming same for use in aquaculture, although use of the edge finishing for a mesh may have numerous applications, so that use in aquaculture should not be seen as limiting.

BACKGROUND ART

The use of wire mesh is ubiquitous. Some examples of its uses include forming barriers, fences (including security fences), cages (including cages to contain animals, while keeping other animals and people out) and so on.

Wire mesh is typically formed by interlacing strands of wire, called pickets. The pickets are shaped to form a desired pattern for the mesh. A common pattern is the diamond pattern which is formed by interlacing a pair of pickets where each picket is formed in a zig-zag configuration. An end of the mesh is generally formed by cutting each picket after it leaves the pattern at the edge of the mesh. The cut off section is generally known as a picket tail. The picket tails are usually sharp and protrude from the edge of the mesh. This not only creates a safety issue, but also provides little impediment to the edge of the mesh being unravelled. Therefore, there is always a need to finish off the edge with an edge finishing.

A common method of edge finishing in the past involved twisting the two picket tails at the end of the interlaced pickets as shown in FIG. 1. While this can be effective in maintaining the integrity of the mesh at the edge, it still creates a significant safety concern as the twisted ends are both rigid and sharp. This method of edge finishing is no longer allowed to be used for some applications in some countries.

Another method of the prior art consists of bending each of the picket tails around each other and back onto the picket to from a single knuckle finishing, as illustrated in FIG. 2. While safer than the twisted finishing, the single knuckle joint can lack the strength to maintain the integrity of the mesh at the edge, and can be pulled apart if sufficient force is applied (for example by being pushed by a large animal).

Of particular interest to the present invention is the use of wire mesh to form a cage for aquaculture. Increasingly in many parts of the world mesh is used to contain fish while they grow. The mesh is typically formed from specially treated wire to increase the lifetime of the mesh in an aquatic environment, and to limit or prevent build up of aquatic matter on the mesh (thus reducing the frequency of cleaning the mesh). These mesh cages, which can extend to the bottom of the water (ocean, river or lake for example) typically have a circumference of around 130 m. The mesh cages need to be sufficiently strong and rigid to both keep the farmed fish safely inside and to keep predator fish out.

The edge finishing of a mesh cage for aquaculture therefore needs to have sufficient strength to maintain the integrity of the mesh around the perimeter against the weight of the mesh, and be safe to handle. The knuckle finishing of FIG. 2 can be too weak for this purpose, while the twisted finishing of FIG. 1 can be too dangerous to handle.

One solution proposed to solve these issues is a double knuckle arrangement as shown in FIG. 3. This arrangement involves bending a pair of pickets at an intersection on the edge of the mesh into a U-shape with its open end facing back towards the body of the mesh, the U-shape lying in the same plane as the mesh. The finishing may be completed by bending the picket tail around an adjacent picket to form a knuckle. When this is done for each pair of pickets (and picket tails) the result, as shown in FIG. 3 is known as a double knuckle since each loop includes two knuckles. The double knuckle edging may be safer than the twisted finishing, but it can still be a hazard if anything catches on the exposed picket tails.

Furthermore, this arrangement can have the disadvantage that the configuration of adjoining U-shaped loops and the manner in which the final knuckles are formed can make forming this double knuckle by machine very difficult. This form of double knuckle is typically formed manually which can have a number of disadvantages, including a significant increase in the labour, time and cost of producing a mesh with this type of double knuckle finishing. Furthermore, as the knuckles are formed manually there can be irregularities in the knuckles around the edge of the mesh, which can lead to distortion of the mesh and uneven distribution of the load on the edges of the mesh which can result in high wear/failure of the over loaded edge.

However a more significant issue is that the length of the preformed picket (i.e. the distance between bends in the picket) and the length of the picket end can be insufficient to completely double back over the adjacent picket when completing the first bend and to form the knuckle. This can result in the adjacent picket being pulled closer to the folded picket, opening a gap between them, as illustrated in FIG. 3. This gap is locked in when the knuckle is completed. Testing has indicated that each gap can be at least 2 mm and in many instances up to 8 mm. The cumulative affect of all the gaps around the circumference (~130 m) of the edge can amount to a shortening of the edge of at least 11 meters in comparison to the central portion of the mesh. A major issue that is caused by a shortened edge is that additional pickets are required to meet a given specification for a length of mesh. Additional pickets for a given length of mesh increases the manufacturing cost and also increases the per meter weight of the mesh, requiring additional floats to be provided for mesh fish cages. Shortening of the edge can also result in a loss of tension in the central portion of the mesh, which in turn can lead to increased rubbing of the pickets at each intersection, thus increasing wear, and removing any surface preparation of the wires (for example antifouling treatment). Furthermore, the loss of tension can create a situation where a large predator can charge at the un-tensioned section of the mesh and can stun or kill the fish inside.

As mentioned earlier it should be appreciated that the applications of the present invention are many and varied so the discussion in relation to aquaculture is just an exemplary example to aid understanding.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Further aspects and advantages of the present invention will become apparent from the ensuing description which is given by way of example only.

DISCLOSURE OF THE INVENTION

According to a first aspect of the present invention there is provided an edge finishing for a mesh formed by interlacing adjacent wire pickets, each picket formed in a zig-zag manner, the edge finishing comprising two interlinked loops where a first loop is formed at a terminal end of a first picket of the adjacent pickets and a second loop is formed at a terminal end of a second picket of the adjacent pickets, wherein the first loop and the second loop are interlocked together, via first and second loop-ends, at an intersection of the first picket and the second picket.

An edge finishing of this type may have several advantages over prior art finishings, including: providing greater resistance to any force applied to the finishing to pull it apart or undo it; improved safety in that the exposed ends of the pickets are formed into loops having no sharp protrusions; improved stability and rigidity of the finishing as the locked loops are held in place with respect to the mesh; and a consequence of locking the loops together is that the adjacent strands of the first and second pickets may also be held in place.

In a preferred embodiment the first loop-end and the second loop-end are interlocked together in a manner that substantially prevents movement of the interlinked loops with respect to one another.

The term 'interlocked', in the context of the present invention, refers to a mutual interconnection in which the first loop-end and the second loop-end go between, or through each other, so that they are linked together in a substantially locked relationship to one another.

In a preferred embodiment a longitudinal axis of each loop is substantially parallel to a longitudinal axis of an adjacent portion of the mesh pattern of the picket from which it is formed.

In a preferred embodiment a plane of each loop is orthogonal to a plane of the mesh.

In a preferred embodiment the shape and dimension of the mesh pattern of a picket adjacent the interlinked loops is substantially the same as the mesh pattern of the remainder of the picket.

An advantage of the arrangement described above is that there may be little or no distortion of the mesh in the vicinity of the edge finishing, and in particular little or no reduction in the spacing between adjacent pickets when the mesh is under tension. This may overcome a problem with prior art finishings where the finishing results in a gap forming at the intersections of the pickets at the edge of the mesh.

In a preferred embodiment a free end of each picket (which is formed into a loop-end) may be located in the plane of the loop of that picket. An advantage of this arrangement may be increased safety when handling the finishing as the usually sharp picket tail is tucked out of the way inside the smooth surface of the loop.

In a preferred embodiment the edge finishing is applied to a plurality of adjacent pickets.

Preferably the edge finishing is applied to the ends of all pickets forming the mesh.

In a preferred embodiment when tension is applied to the mesh there is a substantially straight passageway through the loops.

In a preferred embodiment the passageway is configured to accept a support wire or cord. This may enable a support wire or cord (or similar) to be threaded through the loops thus holding them all together without creating any distortion of the finishing or the mesh. Such a support may be useful for holding the mesh in shape, to attach the mesh to a post or frame, or for attaching a floatation device if the mesh is to be submerged in water, and so on.

In a preferred embodiment the mesh is a diamond pattern mesh.

In a preferred embodiment at least part of the edge finishing is formed using a machine. Those familiar with bending 4 mm wire will appreciate that it requires considerable force to form the pickets into loops. This makes manually forming the edge finish a difficult and strenuous job, particularly as the edge finish becomes more complex. A suitable machine may be able to make the bends, thus saving labour, time and cost in forming the edge finishing. A machine may also produce an edge finishing that is of a consistent standard, rather than the variations that can occur with manually formed edge finishings.

According to another aspect of the present invention there is an edge finishing substantially as described above wherein the edge finishing is formed by a machine.

According to another aspect of the invention there is a method of forming an edge for a mesh comprising a plurality of adjacent interlaced zig zag pickets, the edge being formed at the terminal end of adjacent (first and second) pickets forming a diamond pattern, the method including the steps of:

bending the zag side of a first picket back over top of the zig side of said first picket;
partially straightening the first picket tail with respect to zag side of first picket;
bending the partially straightened first picket tail further around zig side of the second picket until it lies below the zig side of the second picket;
twisting first picket tail until it has the same orientation as the zig side of the first picket to form first loop;
bending the zag side of second picket back under the zig side of the second picket;
partially straightening the second picket tail with respect to the zag side of the second picket;

bending the partially straightened second picket tail further around zig side of the second picket until it lies above the zig side;

twisting the second picket tail through the first loop and over the first picket tail until it has the same orientation as the zig side of the second picket to form a second loop;

twisting both picket tails simultaneously so that the second picket tail meets up with zag side of the second picket, and the first picket tail meets up with zag side of the first picket, to form first and second loop-ends, which interlock the first and second loops.

A method substantially as described above wherein a plane of the first loop is orthogonal to a plane of the mesh.

A method substantially as described above wherein a plane of the second loop is orthogonal to a plane of the mesh.

A method of of forming an edge for a mesh comprising a plurality of adjacent interlaced zig zag pickets, the edge being formed at the terminal end of first and second adjacent pickets in a pair forming a diamond pattern, the method including the steps of:

respectively, forming on a pair of pickets, a first and second loop on each adjacent picket, of the pair, near the terminal end of each picket;

forming a first loop-end on the first picket; and forming a second loop-end on the second picket which is interlocked with the first loop-end on the first picket.

A method substantially as described above including the step of adjusting, if necessary, a distance between the first loop and the second loop to correspond to the maximum lateral distance between the pickets when tensioned.

A method substantially as described above wherein at least one of the steps is performed by a machine.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
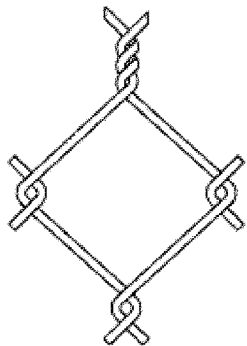
FIG. 1 shows an edge finishing according to one embodiment of the prior art.
Figure 2:
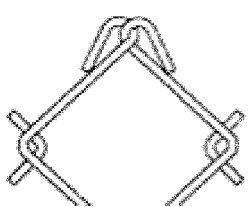
FIG. 2 shows an edge finishing according to another embodiment of the prior art.
Figure 3:
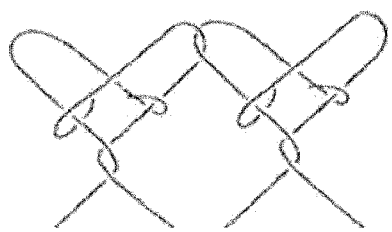
FIG. 3 shows an edge finishing according to yet another embodiment of the prior art.
Figure 4:
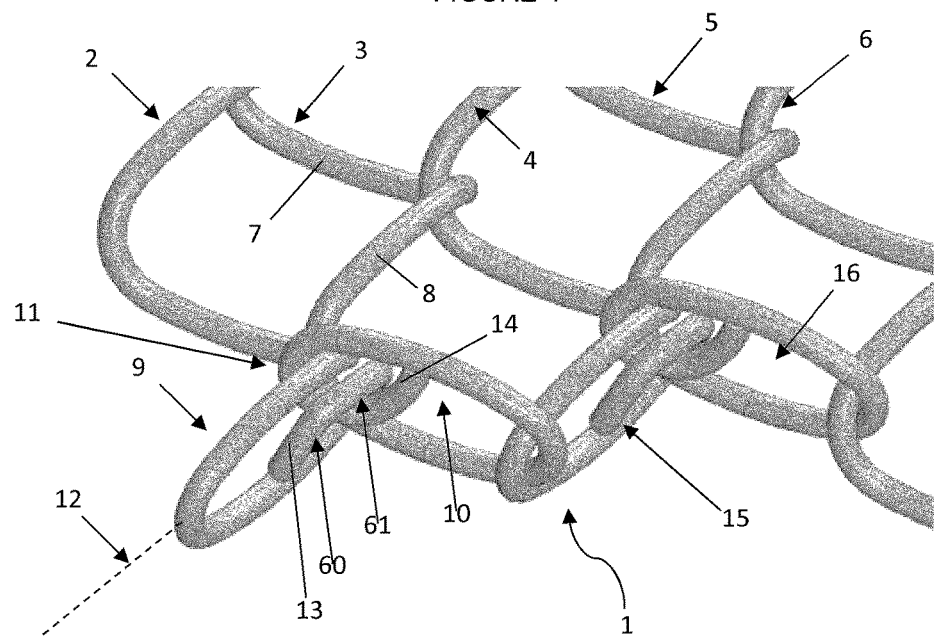
FIG. 4 shows a view of part of a mesh including a finishing according to a preferred embodiment of the present invention.

An edge finishing for a diamond pattern wire mesh according to a preferred embodiment of the present invention is generally indicated by arrow 1 in FIG. 4. The mesh is formed in a diamond pattern (this being the separation of parallel sides of the diamond pattern). The mesh is formed from interlacing pairs of adjacent pickets (2-6) where each picket is in the form of an elongate strand of wire bent at regular intervals into a zig-zag configuration (see for example the adjacent sides (picket end lengths) 7 and 8 of picket 3).

The edge finishing comprises two interlinked loops, generally indicated by arrows 9 and 10 on the left hand side of FIG. 4, where the first loop 9 is formed from a first picket 2 and the second loop 10 is formed from a second picket 3 (which is adjacent to picket 2). The first loop 9 and the second loop 10 are interlocked together at an intersection 11 of the first picket 2 and the second picket 3.

The interlocking of loops 9 and 10 is achieved by bending the end of the pickets 2, 3 to form respective loop-ends 60, 61 which are interlinked together to effectively interlock the first and second loops 9 and 10 together tightly in the vicinity of the intersection 11. This arrangement prevents the interlinked loops 9 and 10 from moving away from the intersection (i.e. prevents lateral movement of the loops with respect to the intersection where they are locked). In particular this arrangement may prevent, or at least minimise, any shortening of the perimeter of the mesh (the finished mesh edge), thus overcoming a problem with at least some of the prior art finishings.

However, those skilled in the art will appreciate that there are other ways in which the loops may be locked in place at an intersection, including, without limitation and depending on the type of wire used to form the mesh, welding, soldering, brazing and binding them in place with additional wire, cord or similar.

As shown in FIG. 4, the loop 9, and indeed each loop, lies in a plane orthogonal to a plane of the mesh. Thus, for example, if the mesh is laid on a flat horizontal surface then the plane of the mesh is a horizontal plane. In this orientation the plane of each loop (defined as the plane which contains the loop) is a vertical plane.

Furthermore, the loops 9 and 10 are formed and interlocked together such that the orientation of a longitudinal axis of the loop (shown as the dashed line 12 for loop 9) is substantially parallel to the longitudinal axis of side 8 of picket 3. A similar arrangement exists for loop 10. In this manner the overall symmetry of the mesh may be retained by the finishing. In other words the shape and dimension of the pickets adjacent the interlinked loops may be substantially the same as the remainder of the mesh. As can be seen in FIG. 4, the ends of each picket tail are not only twisted together, but the picket tails, 13 and 14 of the pickets 2 and 3 are formed into interlinked loop-ends 60, 61 inside the loops 9 and 10 respectively. This arrangement may reduce or eliminate the occurrence of injury caused by contacting the picket tail ends, thus adding significantly to safety in handling the edge finishing of the mesh.

FIG. 4 also shows a further pair of loops, 15 and 16, which are formed from an adjacent pair of interlaced pickets, 4 and 5, where picket 4 is also interlaced with picket 3. In this arrangement loop 15 is interlinked with loop 10. When the edge finishing is applied to all picket ends the result is a linked series of loops along the perimeter of the edge, where each neighbouring pair of loops is locked to an intersection of the pickets forming the mesh. With the picket tail ends of each picket tucked inside a loop the result is a series of smooth surfaces along the edge of the mesh.

Figure 5:
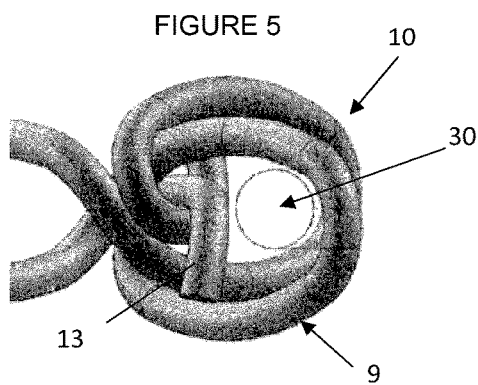
FIG. 5 shows another view of the edge finishing of FIG. 4.

As can be seen in FIG. 5, when viewed from a side the edge finishing of the tensioned mesh, when arranged to be flat, contains a substantially straight passageway 30 through the loops, through which a wire or cable or other type of support member can be passed. This may be done in such a manner that the support member supports the loops of the edge finishing without applying any force likely to distort the arrangement of the loops (i.e. twisting or shortening the distance between neighbouring loops). The support member may be used to provide shape to the edge (i.e. to keep it straight or to create a curve) as well as to provide a method of attaching the mesh to a support (e.g. a post or frame) and to attach other items to the mesh, such as floatation devices.

Figure 6:
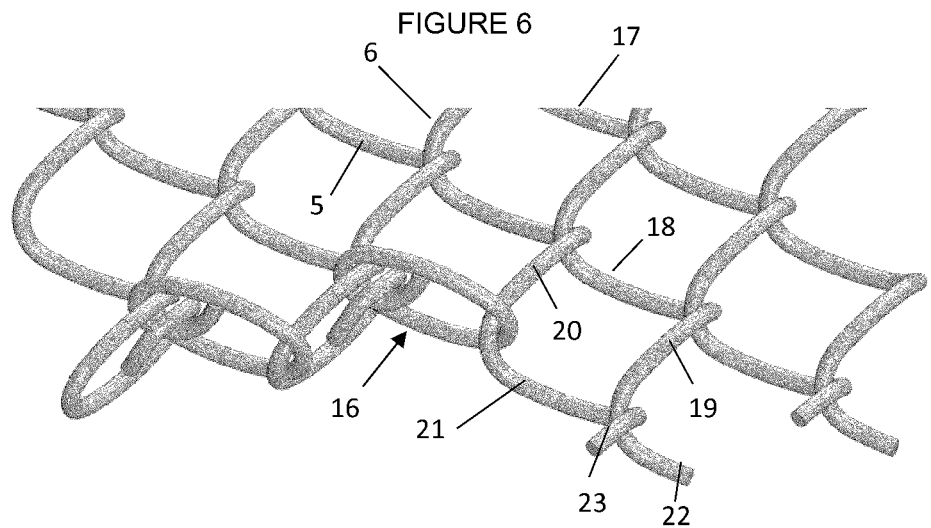
FIG. 6 shows an initial configuration for forming a finishing in the embodiment shown in FIG. 4.

FIG. 6 shows the initial configuration of the pickets prior to formation of the edge finishing.

The method of forming the edge finishing will be described with reference to picket 6, which is interlaced on one side by picket 5 (already finished off) and loop 16, and on the other side is interlaced with picket 17.

The diamond shape of the mesh at the edge has a first zig side 18 and an adjacent second zag side 19, both formed from the same picket, 17, and a third zig side 20 and an adjacent fourth zag side 21, both formed from the same picket 6.

A first picket tail, 22, extends from the second zag side 19 and ends where the picket 17 is cut. A second picket tail, 23, extends from the fourth zag side 21 and ends where the picket 6 is cut.

Figure 7:
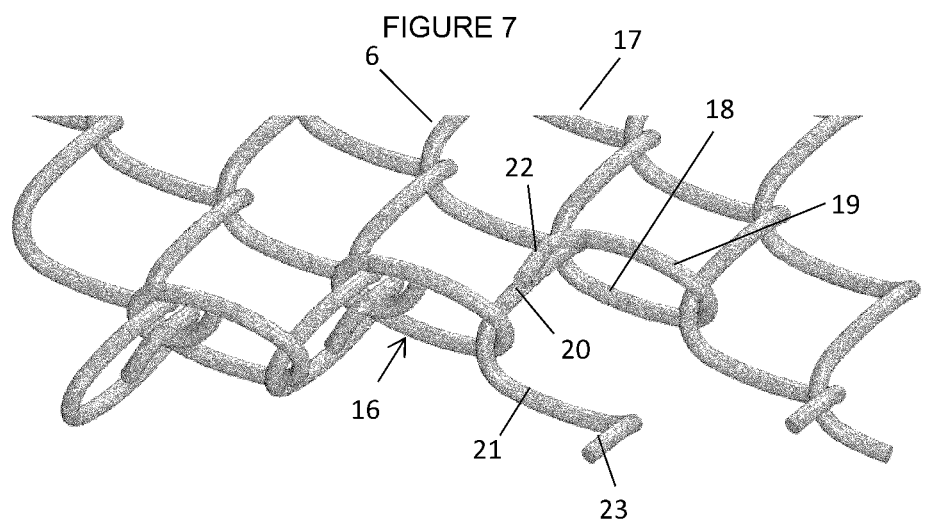
FIG. 7 shows a step in the method of forming a finishing in the embodiment shown in the previous figures.

The first step of the method involves bending the zag side 19 of a first picket 17 back over top of the zig side 18 of picket 17; completion of this step shown in FIG. 7.

Figure 8:
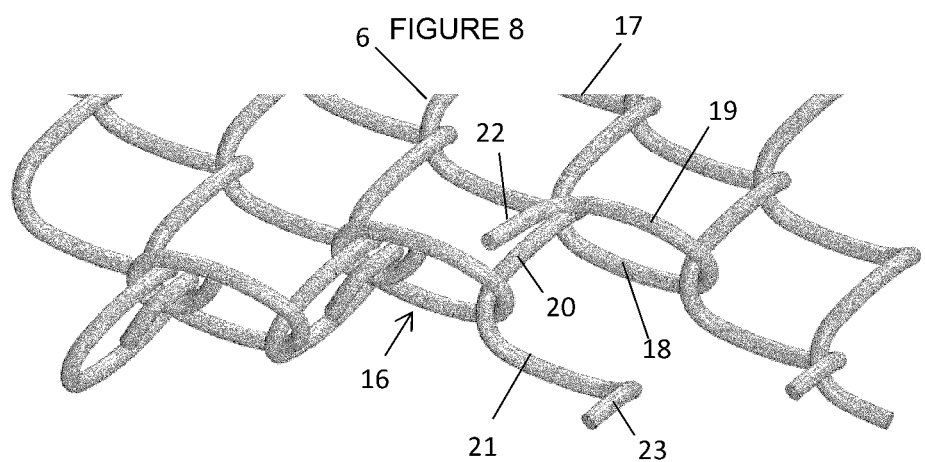
FIG. 8 shows a step in the method of forming a finishing in the embodiment shown in the previous figures.

The second step of the method involves partially straightening the first picket tail 22 with respect to zag side 19; completion of this step shown in FIG. 8.

Figure 9:
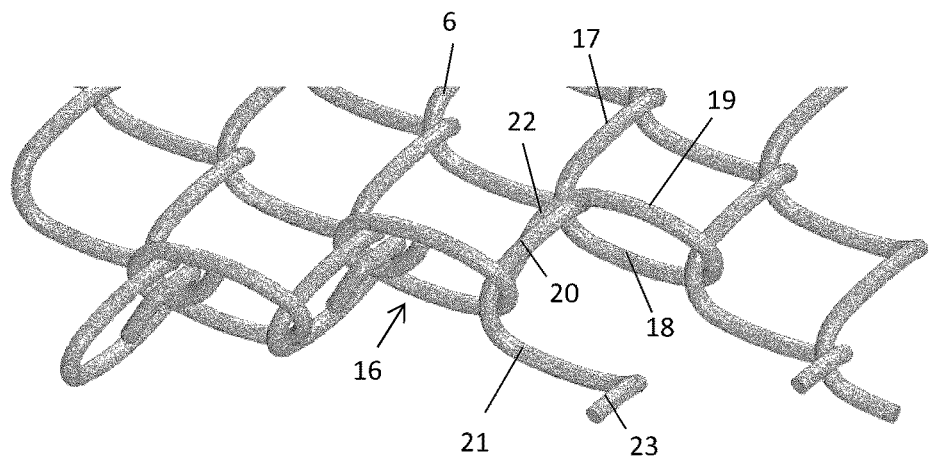
FIG. 9 shows a step in the method of forming a finishing in the embodiment shown in the previous figures.

The third step of the method involves bending the partially straightened first picket tail 22 further around zig side 20 until it lies below the zig side 20; completion of this step shown in FIG. 9

Figure 10:
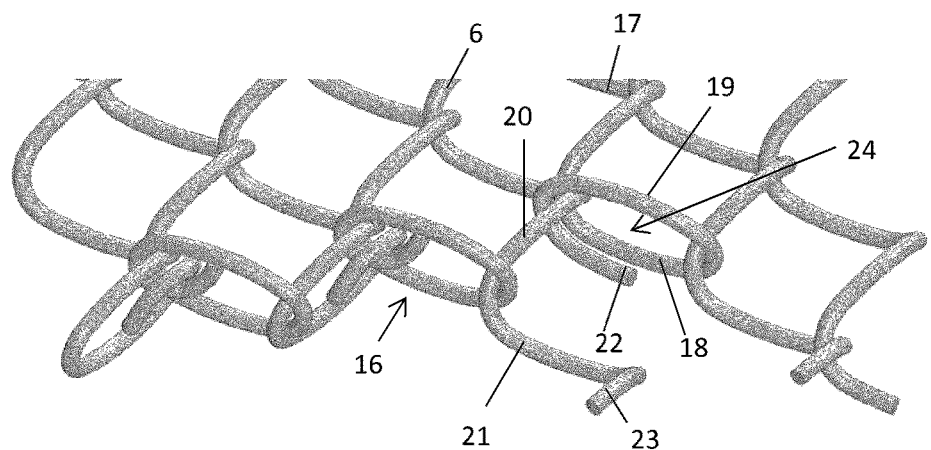
FIG. 10 shows a step in the method of forming a finishing in the embodiment shown in the previous figures.

The fourth step of the method involves twisting first picket tail 22 until it has the same orientation as the zig side 18 to form first loop 24; completion of this step shown in FIG. 10.

Figure 11:
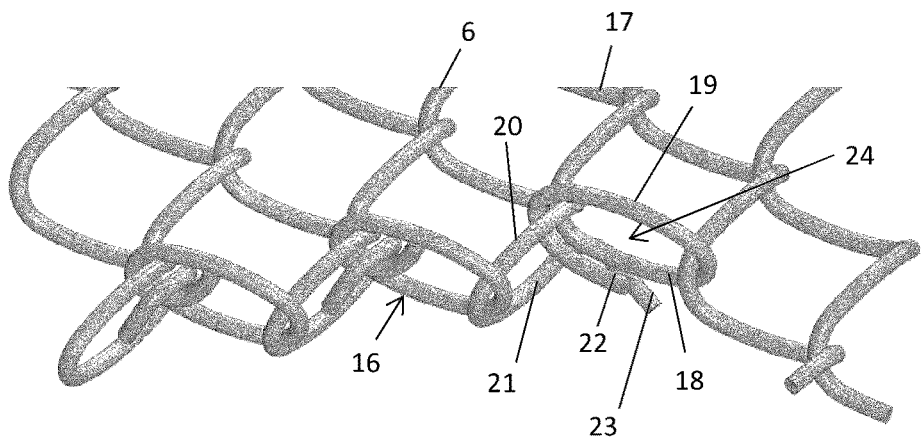
FIG. 11 shows a step in the method of forming a finishing in the embodiment shown in the previous figures.

The fifth step of the method involves bending the zag side 21 of picket 6 back under the zig side 20 of picket 6; completion of this step is shown in FIG. 11

Figure 12:
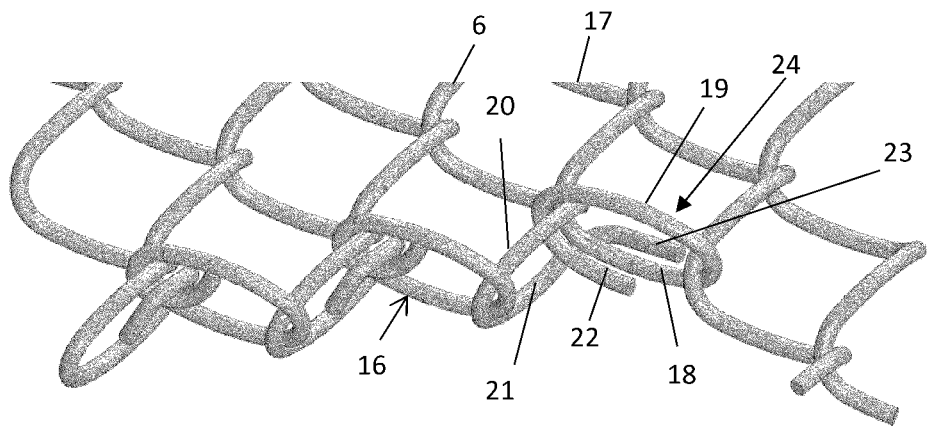
FIG. 12 shows a step in the method of forming a finishing in the embodiment shown in the previous figures.

The sixth step of the method involves partially straightening the second picket tail 23 with respect to zag side 21; completion of this step is shown in FIG. 12.

Figure 13:
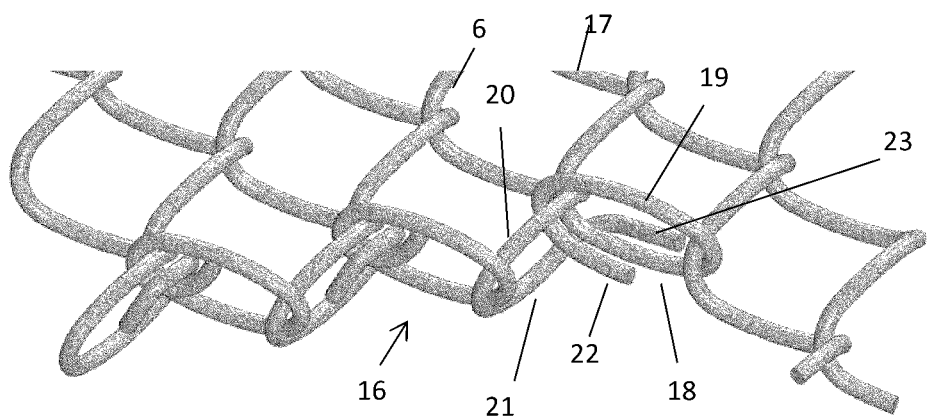
FIG. 13 shows a step in the method of forming a finishing in the embodiment shown in the previous figures.

The seventh step of the method involves bending the partially straightened second picket tail 23 further around zig side 18 until it lies above the zig side 18; completion of this step is shown in FIG. 13.

Figure 14:
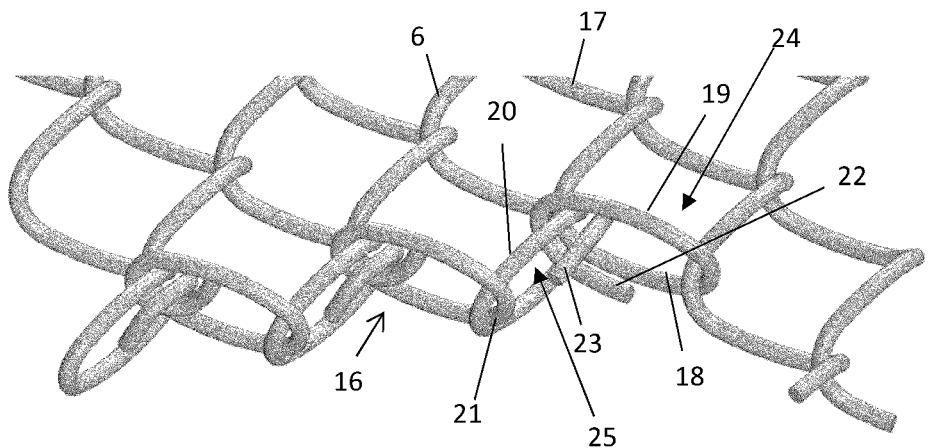
FIG. 14 shows a step in the method of forming a finishing in the embodiment shown in the previous figures.

The eighth step of the method involves twisting second picket tail 23 through the first loop 24 and over the first picket tail 22 until it has the same orientation as the zig side 20 to form second loop 25; completion of this step is shown in FIG. 14.

Figure 15:
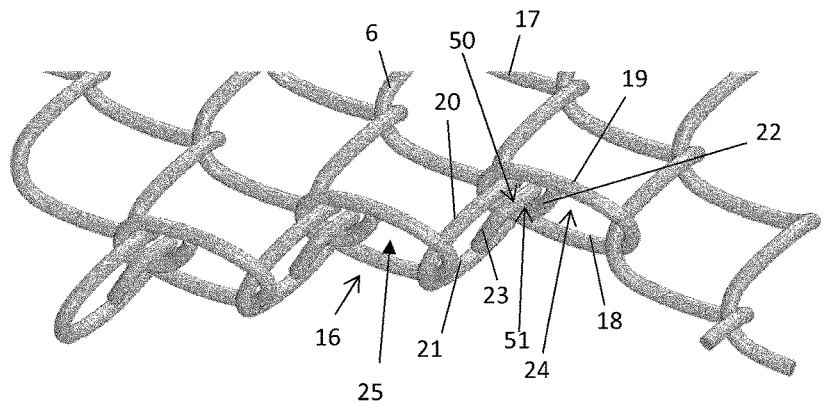
FIG. 15 shows a step in the method of forming a finishing in the embodiment shown in the previous figures.

The ninth step of the method involves twisting both picket tails simultaneously so that 23 meets up with 21, and 22 meets up with 19, to form first and second loop-ends 50, 51, which interlock the first and second loops; completion of this step is also shown in FIG. 15

Figure 16:
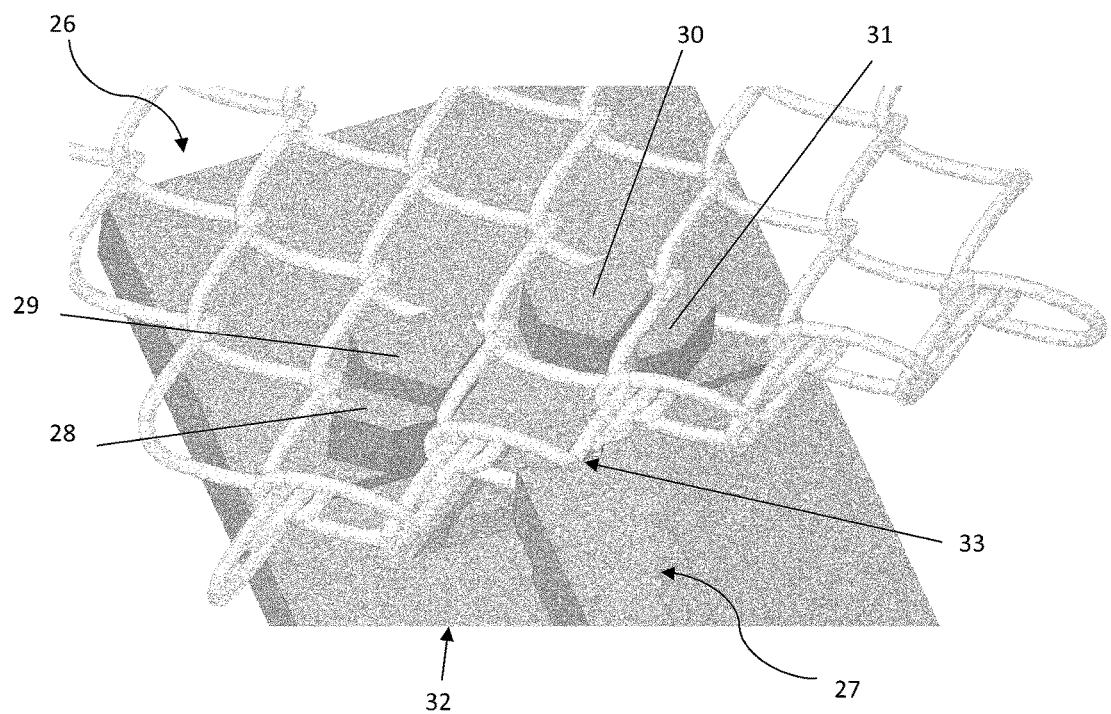
FIG. 16 shows part of a machine used to complete the edge finishing.

Part of a machine used to complete the edge finishing is shown in FIG. 16. The machine is used to adjust the angle and separation between a pair of interlinked locked loops so that the end pattern of the mesh (i.e. the sides of the pickets below the locked intersection) are in the correct positions for the diamond pattern mesh. This may help ensure that the length of the finished edge of the mesh is not shortened, or at least that any shortening is minimised.

The machine comprises two sections, a first section, generally indicated by arrow 26, configured to hold the strands of the mesh in the vicinity of the edge in their correct diamond pattern, and a second section, generally indicated by arrow 27, which is configured to apply a force to the outer edges of the loops. The first section includes a series of blocks, 28-31 in FIG. 16, between which the pickets are held in place. The blocks are in turn configured to ensure the pickets are firmly held in a diamond pattern. The second section includes a moveable block 32 having a rebate 33 on the front edge which is configured to accept the outer edges of the interlinked locked loops.

A force may be applied to the loops by moving the second section 27 of the machine towards the blocks of the first section. The initial movement forces the ends of the loops into opposite sides of the rebate 33, which changes the angle between the planes of the loops which may remove any remaining gap at the intersections of picket pairs. Further movement may then push the loops back towards the mesh, thus partially flattening the edge finishing against the mesh. This movement may result in the pickets at the edge of the mesh moving slightly out of parallel with the axis of the neighbouring loop, as well as tightening the bent wire forming the locking mechanism at the intersection of the pickets.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope of the appended claims.

What we claim is:

1. An edge finishing for a mesh formed by interlacing adjacent wire pickets, each picket formed in a zig-zag manner, the edge finishing comprising two interlinked loops where a first loop is formed by bending a first picket tail of a first picket of the adjacent pickets so that a first end of the first picket is substantially adjacent another part of the first picket and a second loop is formed by bending a second picket tail of a second picket of the adjacent pickets so that a second end of the second picket is substantially adjacent another part of the second picket, wherein the first loop and the second loop are interlocked together, via first and second loop-ends, at an intersection of the first picket and the second picket, in a manner that substantially prevents lateral movement of the interlinked loops with respect to one another.

2. The edge finishing as claimed in claim 1, wherein the first loop-end of the first loop interlocks with both the second loop and the second loop-end of the second loop; and the second loop-end interlocks with both the first loop and the first loop-end of the first loop.

3. The edge finishing as claimed in claim 1 wherein a longitudinal axis of each loop is substantially parallel to a longitudinal axis of an adjacent portion of the mesh pattern of the picket from which it is formed.

4. The edge finishing as claimed in claim 1, wherein a plane of each loop is orthogonal to a plane of the mesh.

5. The edge finishing as claimed in claim 1, wherein the shape and dimension of the mesh pattern of a picket adjacent the interlinked loops is substantially the same as the mesh pattern of the remainder of the picket.

6. The edge finishing as claimed in claim 1, wherein a free end of each picket is located inside the loop and in the plane of the loop of that picket.

7. The edge finishing as claimed in claim 1 wherein the edge finishing is applied to a plurality of adjacent pickets.

8. The edge finishing as claimed in claim 7 wherein when the mesh is arranged to be flat, and tension is applied to the adjacent pickets, there is a substantially straight passageway formed through the loops.

9. The edge finishing as claimed in claim 8 wherein the passageway is configured to accept a support wire or cord.

10. The edge finishing as claimed in claim 7, wherein the adjacent pickets form a diamond pattern mesh.

11. A method of forming an edge for a mesh comprising a plurality of adjacent interlaced zig zag pickets, the edge being formed at the terminal end of adjacent first and second pickets forming a diamond pattern, the method including the steps of:

bending the zag side of a first picket back over top of the zig side of first picket;

partially straightening the first picket tail with respect to zag side of the first picket;

bending the partially straightened first picket tail further around zig side of the second picket until it lies below the zig side of the second picket;

twisting first picket tail until it has the same orientation as the zig side of the first picket to form first loop;

bending the zag side of second picket back under the zig side of the second picket;

partially straightening the second picket tail with respect to the zag side of the second picket;

bending the partially straightened second picket tail further around zig side of the second picket until it lies above the zig side;

twisting the second picket tail through the first loop and over the first picket tail until it has the same orientation as the zig side of the second picket to form a second loop;

twisting both picket tails simultaneously so that the second picket tail meets up with zag side of the second picket, and the first picket tail meets up with zag side of the first picket, to form first and second loop-ends, which interlock the first and second loops, wherein the first loop is formed by bending the first picket tail of the first picket of the adjacent pickets so that a first end of the first picket is substantially adjacent another part of the first picket and the second loop is formed by bending the second picket tail of the second picket of the adjacent pickets so that a second end of the second picket is substantially adjacent another part of the second picket.

12. The method as claimed in claim 11 wherein a plane of the first loop is orthogonal to a plane of the mesh.

13. The method as claimed in claim 12 wherein a plane of the second loop is orthogonal to a plane of the mesh.

14. The method as claimed in claim 11, including the step of adjusting a distance between the first loop and the second loop at the interlocked outer ends of the loops to correspond to the maximum lateral distance between the pickets when tensioned.

15. The method as claimed in claim 11 wherein at least one of the steps is performed by a machine.

16. The edge finishing as claimed in claim 2 wherein a longitudinal axis of each loop is substantially parallel to a longitudinal axis of an adjacent portion of the mesh pattern of the picket from which it is formed.

17. The edge finishing as claimed in claim 2, wherein the shape and dimension of the mesh pattern of a picket adjacent the interlinked loops is substantially the same as the mesh pattern of the remainder of the picket.

18. The edge finishing as claimed in claim 3, wherein the shape and dimension of the mesh pattern of a picket adjacent the interlinked loops is substantially the same as the mesh pattern of the remainder of the picket.

19. The edge finishing as claimed in claim 2, wherein a free end of each picket is located inside the loop and in the plane of the loop of that picket.

20. The edge finishing as claimed in claim 4, wherein a free end of each picket is located inside the loop and in the plane of the loop of that picket.

21. The edge finishing as claimed in claim 8, wherein the adjacent pickets form a diamond pattern mesh.

22. The method as claimed in claim 12, including the step of adjusting a distance between the first loop and the second loop at the interlocked outer ends of the loops to correspond to the maximum lateral distance between the pickets when tensioned.

23. The method as claimed in claim 13, including the step of adjusting a distance between the first loop and the second loop at the interlocked outer ends of the loops to correspond to the maximum lateral distance between the pickets when tensioned.

24. The edge finishing as claimed in claim 2 wherein the edge finishing is applied to a plurality of adjacent pickets.

25. The edge finishing as claimed in claim 24 wherein when the mesh is arranged to be flat, and tension is applied to the adjacent pickets, there is a substantially straight passageway formed through the loops.

26. The edge finishing as claimed in claim 3 wherein the edge finishing is applied to a plurality of adjacent pickets.

27. The edge finishing as claimed in claim 26, wherein the adjacent pickets form a diamond pattern mesh.

28. The edge finishing as claimed in claim 4 wherein the edge finishing is applied to a plurality of adjacent pickets.

29. The edge finishing as claimed in claim 28 wherein when the mesh is arranged to be flat, and tension is applied to the adjacent pickets, there is a substantially straight passageway formed through the loops.

30. The edge finishing as claimed in claim 28, wherein the adjacent pickets form a diamond pattern mesh.

31. The edge finishing as claimed in claim 5 wherein the edge finishing is applied to a plurality of adjacent pickets.

32. The edge finishing as claimed in claim 31, wherein the adjacent pickets form a diamond pattern mesh.

33. The edge finishing as claimed in claim 6 wherein the edge finishing is applied to a plurality of adjacent pickets.

34. The edge finishing as claimed in claim 33 wherein when the mesh is arranged to be flat, and tension is applied to the adjacent pickets, there is a substantially straight passageway formed through the loops.

35. The method as claimed in claim 12 wherein at least one of the steps is performed by a machine.

36. The method as claimed in claim 13 wherein at least one of the steps is performed by a machine.

37. The method as claimed in claim 14 wherein at least one of the steps is performed by a machine.

\* \* \* \* \*